(12) United States Patent
Inaba

(10) Patent No.: US 9,061,208 B2
(45) Date of Patent: Jun. 23, 2015

(54) VIDEO GAME SYSTEM

(75) Inventor: Yasuke Inaba, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 160 days.

(21) Appl. No.: 13/104,338

(22) Filed: May 10, 2011

(65) Prior Publication Data

US 2011/0312425 A1    Dec. 22, 2011

(30) Foreign Application Priority Data

Jun. 21, 2010   (JP) ................................. 2010-140305

(51) Int. Cl.
*G06F 21/41* (2013.01)
*A63F 13/30* (2014.01)

(52) U.S. Cl.
CPC ........... *A63F 13/12* (2013.01); *A63F 2300/407* (2013.01); *A63F 2300/513* (2013.01); *A63F 2300/531* (2013.01); *A63F 2300/5533* (2013.01); *A63F 2300/807* (2013.01)

(58) Field of Classification Search
CPC ..................... A63F 2300/531; H04L 63/0815; G06F 21/41
USPC ......... 463/42; 709/205; 715/764, 850; 726/6, 726/8
See application file for complete search history.

(56) References Cited

U.S. PATENT DOCUMENTS

| 7,887,416 | B2 | 2/2011 | Katsume et al. | |
|---|---|---|---|---|
| 2003/0177187 | A1* | 9/2003 | Levine et al. | 709/205 |
| 2007/0088764 | A1 | 4/2007 | Yoon et al. | |
| 2008/0183841 | A1 | 7/2008 | Isokawa et al. | |
| 2009/0100133 | A1* | 4/2009 | Giulio et al. | 709/203 |
| 2009/0235191 | A1* | 9/2009 | Garbow et al. | 715/764 |
| 2011/0126272 | A1* | 5/2011 | Betzler et al. | 726/6 |
| 2014/0136726 | A1* | 5/2014 | Van Wie et al. | 709/231 |

FOREIGN PATENT DOCUMENTS

| EP | 1777914 | 4/2007 |
|---|---|---|
| JP | 2002-219283 | 6/2002 |
| WO | 03/069467 | 8/2003 |

OTHER PUBLICATIONS

M. Assiotis et al., "A Distributed Architecture for Massively Multiplayer Online Role-Playing Games", May 13, 2005. XP002661971. MIT CSAIL Retrieved from the Internet: URL:http://pdos.csail.mit.edu/6.824-2005/reports/assiotis.pdf [retrieved on Oct. 24, 2011].

(Continued)

*Primary Examiner* — Kang Hu
*Assistant Examiner* — Syvila Weatherford
(74) *Attorney, Agent, or Firm* — Greenblum & Bernstein, P.L.C.

(57) ABSTRACT

A video game system includes a plurality of servers and one or more client terminals. Each server provides game information to the client terminal. The client terminal carries out information communication with the server in accordance with a protocol; carries out the video game on a zone on the basis of the game information; and carries out, in response to a request to change zones, zone changing processing. In the zone changing processing, the client terminal updates a valid flag indicating that the protocol for a current zone is valid to a state indicating that the protocol is invalid; determines whether there is the session information for a new zone or not; and updates the valid flag indicating that the protocol for the new zone is invalid to a state indicating that the protocol is valid in a case where there is the session information.

18 Claims, 4 Drawing Sheets

(56) References Cited

OTHER PUBLICATIONS

Binh Dung T N. et al., "A dynamic load sharing algorithm for massively multiplayer online games", Networks. 2003. ICON2003. The 11th IEEE International Conference on Sept. 28-Oct. 1, 2003, Piscataway, NJ. USA. IEEE. XP10168514, Sep. 28, 2003, pp. 131-136, XP010683514.

Search report from EP. mail date is Nov. 4. 2004.

* cited by examiner

SERVER INFORMATION

| ZONE NAME | SERVER ID | PROTOCOL ID | ... |
|---|---|---|---|
| aaa | 001 | A | ... |
| bbb | 002 | B | ... |
| ccc | 003 | C | ... |
| ⋮ | ⋮ | ⋮ | ⋮ |

Fig. 4

SESSION INFORMATION

| HISTORY NUMBER | SERVER ID | VALID FLAG | SESSION ID | REMAINING AMOUNT OF TIME | ... |
|---|---|---|---|---|---|
| 1 | 001 | 1 | 1111 | – | ... |
| 2 | 002 | 0 | 2222 | 3:00 | ... |
| 3 | 003 | 0 | 3333 | 2:00 | ... |
| ⋮ | ⋮ | ⋮ | ⋮ | ⋮ | ⋮ |

Fig. 5

PROTOCOL INFORMATION

| PROTOCOL ID | HEALTH CHECK INTERVAL | NECESSARY PROTOCOL | ... |
|---|---|---|---|
| A | 30 | MOVEMENT ON MAP, BATTLE DETERMINATION, ⋯ | ... |
| B | 30 | MOVEMENT ON MAP, BATTLE DETERMINATION, ⋯ | ... |
| C | 30 | MOVEMENT ON MAP, BATTLE DETERMINATION, ⋯ | ... |
| ⋮ | ⋮ | ⋮ | ⋮ |

VIDEO GAME SYSTEM

CROSS-REFERENCE TO RELATED APPLICATION

The present application relates to subject matter contained in Japanese Patent Application No. 2010-140305, filed on Jun. 21, 2010, the disclosure of which is expressly incorporated herein by reference in its entirety.

BACKGROUND OF THE INVENTION

1. Field of the Invention

The present invention relates to technique for carrying out various kinds of processing relating to a video game system provided with a plurality of servers and one or more client terminals, which are connected to each other via a communication network.

2. Description of the Related Art

Heretofore, an online game of the type to be played by carrying out various kinds of processing between a client terminal and one or more servers via a communication network becomes common.

In such an online game, for example, a plurality of servers are configured so that each server delivers game information, whose story is different from each other, of the same series (for example, Japanese Patent Application Publication No. 2002-219283). By allowing the online game to proceed using the plurality of servers, the amount of information used in the online game can be increased.

However, in the conventional online game system, in a case where the client terminal changes servers as a communication target, the client terminal is required to carry out various kinds of processing to establish a communication state with a new server (for example, processing to identify a user and the like). Therefore, there has been a problem that a load of network processing in the online game system becomes enormous.

Further, there has also been a problem that a user is kept waiting a period of time required to establish a communication connection to a server whenever the servers are changed and this reduces an interest of the online game by the user.

SUMMARY OF THE INVENTION

The present invention has been made in order to solve the problems described above, and it is an object of the present invention to reduce a load on network processing of a client terminal and a plurality of servers when a video game (i.e., online game) proceeds by connecting the client terminal to the plurality of servers.

In order to achieve the above object, the present invention is directed to a video game system including a plurality of servers and one or more client terminals. In the video game system according to the present invention, the plurality of servers are connected to each other via a communication network; the one or more client terminals are allowed to carry out a video game provided by the plurality of servers; and the video game proceeds on a plurality of movable zones.

Each of the plurality of servers includes a game information memory that stores game information therein, the game information being used for a progress of the video game.

Each of the plurality of servers also includes a game information provider that provides the game information to the client terminal.

Further, each of the one or more client terminals includes a session information memory that stores multiple pieces of session information therein, identification information for uniquely specifying the servers being associated with a valid flag in each piece of session information, the valid flag indicating whether each of protocols is valid or invalid, the protocols respectively corresponding to the servers when the client terminal carries out information communication with the servers.

Each of the one or more client terminals also includes an information communicator that carries out, in accordance with a protocol indicating that the valid flag is valid, information communication with the server corresponding to the protocol.

Each of the one or more client terminals also includes a game executor that carries out the video game on the zone, provided so as to be associated with the server with which the information communicator carries out the information communication, on the basis of the game information from the game information provider in the server.

Each of the one or more client terminals also includes a zone changing processor that carries out zone changing processing in response to a request to change zones, in the zone changing processing a current zone indicating a currently used zone is changed into a new zone indicating a zone changed from the current zone, the request being used in the video game carried out by the game executor.

In this case, the zone changing processor of each of the one or more client terminals includes a protocol invalidator that updates the valid flag, which indicates that the protocol associated with the server corresponding to the current zone is valid, to a state indicating that the protocol is invalid.

The zone changing processor also includes a session information determiner that refers to the session information memory to determine whether there is the session information associated with the server corresponding to the new zone or not.

The zone changing processor also includes a protocol validator that updates the valid flag, which indicates that the protocol associated with the server corresponding to the new zone is invalid, to a state indicating that the protocol is valid in a case where the session information determiner determines that there is the session information.

By configuring the video game system in this manner as described above, it becomes possible to reduce a load on network processing of a client terminal and a plurality of servers when a video game proceeds by connecting the client terminal and the plurality of servers.

In the video game system according to the present invention, it is preferable that the zone changing processor includes a session information creator that creates session information, in which the valid flag indicating whether the protocol associated with the server corresponding to the new zone is valid or invalid is set to a state indicating that the protocol is valid, in a case where the session information determiner determines that there is not the session information, and stores the created session information in the session information memory.

In the video game system according to the present invention, it is preferable that the client terminal includes a session information eraser that erases the session information, for which a predetermined erasing condition is met, of the multiple pieces of session information each including the valid flag indicating that the protocol is invalid.

In the video game system according to the present invention, it is preferable that the session information eraser erases the session information for which a predetermined period of time elapses since the protocol invalidator updated the valid flag.

In the video game system according to the present invention, it is preferable that the session information eraser erases at least one of the multiple pieces of session information in a case where the number of the multiple pieces of session information stored in the session information memory exceeds a predetermined upper limit number.

According to the present invention, it is possible to reduce a load on network processing of a client terminal and a plurality of servers when a video game proceeds by connecting the client terminal to the plurality of servers.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, an example of one embodiment according to the present invention will be described with reference to the appending drawings.

Figure 1:
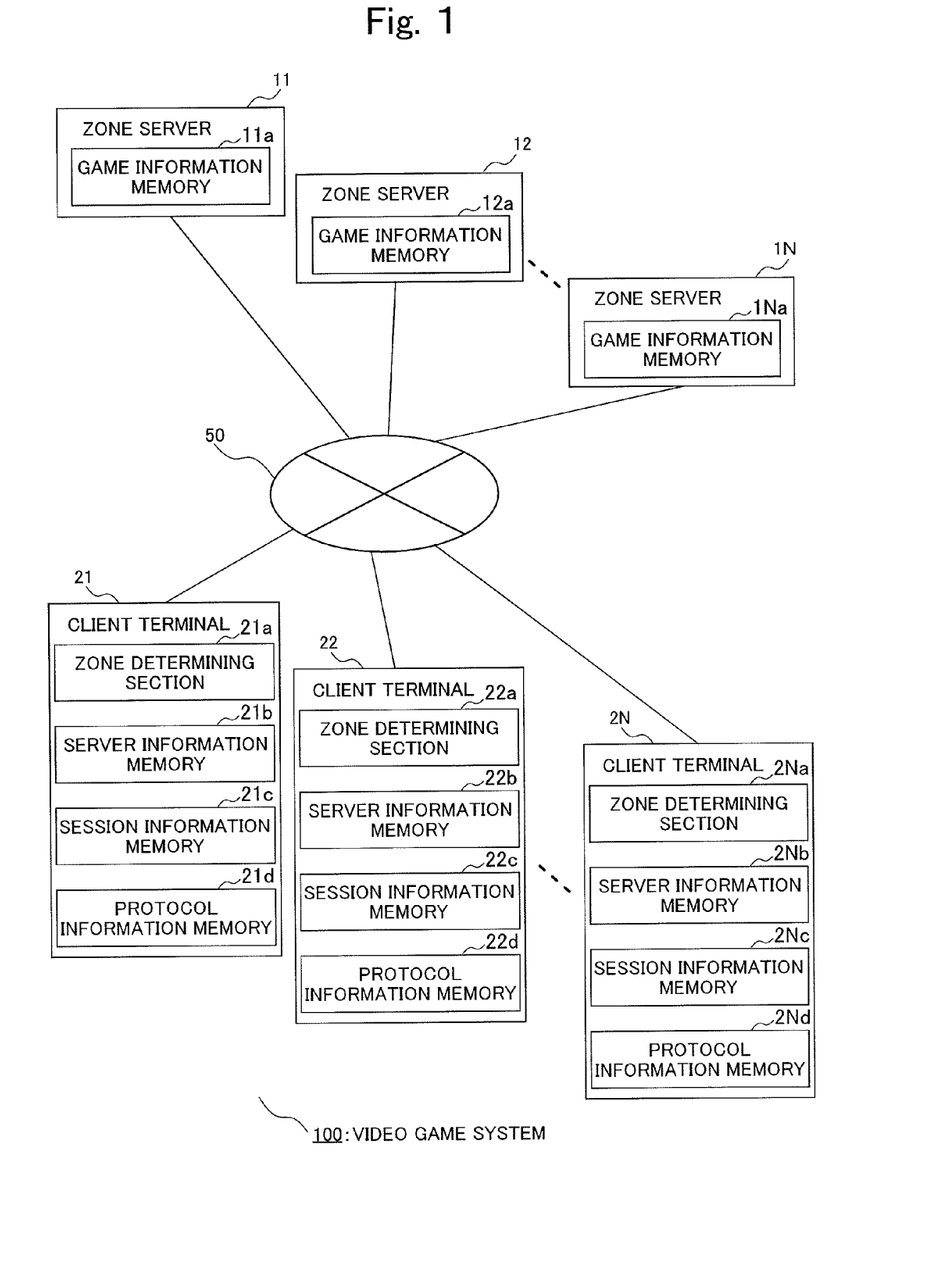
FIG. 1 is a block diagram showing an example of a configuration of a video game system.

FIG. 1 is a block diagram showing an example of a configuration of a video game system 100 according to one embodiment of the present invention. As shown in FIG. 1, the video game system 100 includes: a plurality of zone servers 11 to 1N ("N" is an arbitrary integer) each of which delivers a game environment (i.e., an environment in which a video game can be carried out); and a plurality of client terminals 21 to 2N ("N" is an arbitrary integer).

The plurality of client terminals 21 to 2N are respectively connected to the plurality of zone servers 11 to 1N via the communication network 50 such as the Internet.

The video game system 100 according to the present embodiment has various kinds of functions to carry out a video game provided by the plurality of zone servers 11 to 1N connected to each other via the communication network 50. The video game system 100 causes the video game to proceed on a plurality of movable zones.

Each of the zone servers 11 to 1N is managed by a system administrator of the video game system 100, for example, and has various kinds of functions to deliver game information to each of the client terminals 21 to 2N. Each of the zone servers 11 to 1N is configured by an information-processing device such as a WWW server. The zone servers 11 to 1N include game information memories 11a to 1Na for storing the game information, respectively.

In the present embodiment, a case where the zone servers 11 to 1N respectively deliver information (i.e., zone information) for configuring a virtual space (i.e., zone) in the video game carried out by each of the client terminals 21 to 2N as the game information will be described. In this regard, the zone means a "map" in a video game such as an RPG.

In order to avoid a negative effect (for example, poor communication) resulting from a situation that the number of client terminals 21 to 2N, which are targets as information communication, becomes enormous, a plurality of zone servers 11 to 1N are prepared. In this regard, each of the plurality of zone servers 11 to 1N may provide the same zone information. In this case, each of the client terminals 21 to 2N that communicates with different one of the zone servers 11 to 1N carries out the video game in a parallel universe in the virtual space.

Figure 2:
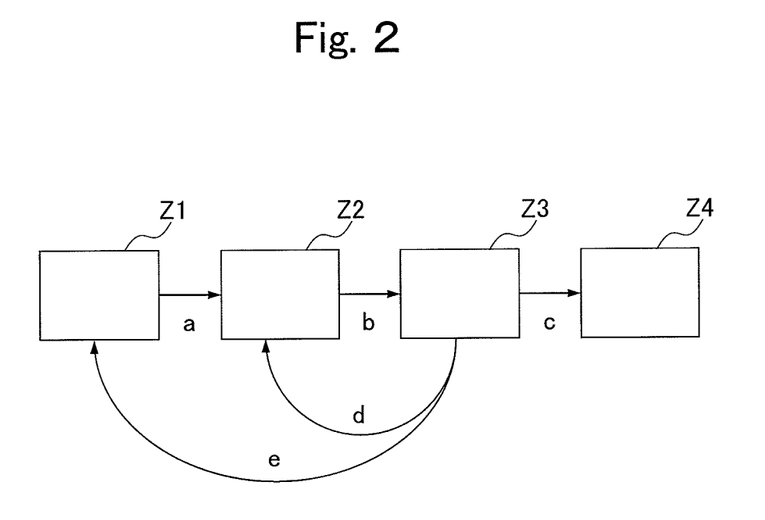
FIG. 2 is an explanatory drawing for explaining a relationship between a zone and a zone server.

Here, a relationship between the zones and the zone servers 11 to 1N in the video game system 100 according to the present embodiment will be described briefly.

FIG. 2 is an explanatory drawing for explaining a relationship between the zones and the zone servers 11 to 1N. Reference numerals Z1 to Z4 in FIG. 2 respectively denote zones that are outputted in the client terminal 21 by the information communication with the zone servers 11 to 14, for example. A user of the client terminal 21 plays the video game on the zone outputted in the client terminal 21. Further, reference numerals a to e in FIG. 2 respectively denote transition roots of the zones outputted in one of the client terminals 21 to 2N. Namely, the video game in the present embodiment is one in which movement (or jump) between zones is allowed in accordance with progress of the video game and the like, for example.

For example, the zone Z3 through the zone Z1 and the zone Z2 is used in the client terminal 21. In this case, the client terminal 21 stores communication history with the zone server 11 or zone server 12 that carried out the information communication with the client terminal 21 (in the present embodiment, session information which will be described later) for carrying out the video game on the zone Z1 or zone Z2. Then, for example, in a case where the client terminal 21 jumps from the zone Z3 to the zone Z1, the client terminal 21 carries out information communication with the zone server 11 using communication history with the zone server 11. By configuring the video game system 100 in such a manner, it is possible to reduce the amount of processing (for example, specification of a protocol according to each of the zone servers, user authentication in each of the zone servers, and the like) necessary for jumping to the zones Z1, Z2 respectively corresponding to the zone servers 11, 12, each of which has its own communication history compared with a case of shifting from the zone Z3 to the new zone Z4 (that is, a case of starting information communication with the zone server 14 that has no communication history), for example.

In this regard, processing to concretely realize a concept of the video game system 100 according to the present embodiment will be explained later in detail (see FIG. 6).

Each of the client terminals 21 to 2N is managed by a user who enjoys the video game, and is configured by an information-processing device such as a personal computer or a mobile communication terminal, for example. Each of the client terminals 21 to 2N includes hardware (for example, a display device for displaying a game screen, an audio output device and the like) and software for carrying out the video game by connecting to the zone servers 11 to 1N via the communication network 50 and carrying out communication with the zone servers 11 to 1N. In this regard, each of the client terminals 21 to 2N may be configured so as to have a function to carry out the video game in the same zone as each other via the zone servers 11 to 1N.

Further, the client terminals 21 to 2N respectively include: zone determining sections 21a to 2Na; server information memories 21b to 2Nb; session information memories 21c to 2Nc; and protocol information memories 21d to 2Nd.

Each of the zone determining sections 21a to 2Na has a function to carry out determination relating to the zones (zone determination) in jump processing (will be described later). In the present embodiment, when each of the client terminals 21 to 2N change zone servers that are communication targets, each of the zone determining section 21a to 2Na determines whether the communication target after change is the zone server with which the client terminal 21 to 2N has carried out communication in the past or not.

Each of the server information memories 21b to 2Nb is a storage medium for storing server information. The server information indicates predetermined kinds of information relating to the zone servers 11 to 1N.

Figure 3:
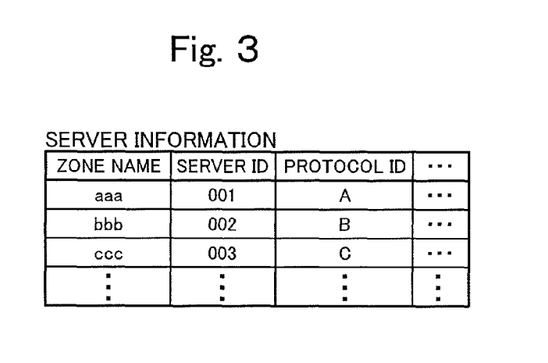
FIG. 3 is an explanatory drawing showing an example of a storage state of server information.

FIG. 3 is an explanatory drawing showing an example of a storage state of the server information in the server information memory 21a to 2Na. As shown in FIG. 3, the server information contains: zone names; server IDs for respectively specifying the zone servers 11 to 1N uniquely; and protocol IDs for respectively specifying protocols. The protocol IDs indicate processing carried out mutually when the client terminals 21 to 2N communicate with the zone servers 11 to 1N, uniquely.

The session information memories 21c to 2Nc are storage mediums for respectively storing session information indicating information on information communication between the client terminals 21 to 2N and each of the zone servers 11 to 1N. In this regard, the session information according to the present embodiment is created and stored when each of the client terminals 21 to 2N carries out communication with any of the zone servers 11 to 1N. Namely, in the present embodiment, each of the client terminals 21 to 2N creates the session information in every zone server 11 to 1N, and does not create session information corresponding to any of the zone servers 11 to 1N with which the client terminal 21 to 2N has never communicate. Each of the zone determining section 21a to 2Na carries out zone determination by referring to the session information.

Figure 4:
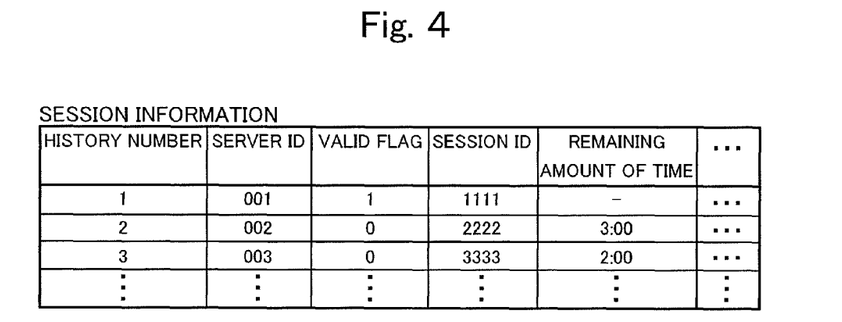
FIG. 4 is an explanatory drawing showing an example of a storage state of session information.

FIG. 4 is an explanatory drawing showing an example of a storage state of the session information in each of the session information memories 21c to 2Nc. As shown in FIG. 4, the session information contains: a history number indicating the order in which each piece of session information is stored; a server ID; a valid flag; a session ID; and the remaining amount of time. Since the session information contains the server IDs, it is possible to manage the zone servers 11 to 1N respectively indicated by the server IDs and the zones and protocols corresponding to the zone server 11 to 1N so as to be associated with the valid flag.

Here, the "valid flag" is a flag indicating whether a protocol used for communication with the zone servers 11 to 1N is valid or invalid. In a case where the protocol is valid, the valid flag is set to "1". In a case where the protocol is invalid, the valid flag is set to "0". In this regard, in the present embodiment, each of the client terminals 21 to 2N specifies the protocol information corresponding to the server ID without terminating a connection to each of the zone servers 11 to 1N in accordance with the session information in which the valid flag is set to "0", and sets part of the protocol information (necessary protocol) according to the corresponding zone servers 11 to 1N to invalid. Setup and update of the valid flag are carried out by each of the client terminals 21 to 2N.

The "session ID" means identification information delivered from each of the zone servers 11 to 1N for identifying the user of each of the client terminals 21 to 2N. When the information communication with any of the zone servers 11 to 1N is started, the corresponding zone server 11 to 1N can identify the client terminals 21 to 2N (that is, it becomes possible to carry out session management) by transmitting the session ID, which has been delivered from the client terminals 21 to 2N once, to the zone servers 11 to 1N, which have delivered the session ID. In this regard, in the present embodiment, each of the zone servers 11 to 1N creates the identification information (i.e., session ID) for each of the client terminals 21 to 2N by carrying out predetermined processing necessary for the user authentication in the communication with each of the client terminals 21 to 2N; delivers and manages the created identification information. A detailed explanation of concrete content of the session management will be omitted herein because a known method is used for the session management.

Further, "the remaining amount of time" indicates remaining time until the session information classified into a previous session and managed is erased. In the present embodiment, each of the client terminals 21 to 2N has a function to set up a predetermined period of time (for example, three minutes or the like) as the remaining amount of time, and to start measurement of the remaining amount of time thus set up, when the valid flag of the session information is changed from "1" to "0". In this regard, when the valid flag is changed from "0" to "1", each of the client terminals 21 to 2N does not erase the session information during the communication, but erases the remaining amount of time.

Each of the protocol information memories 21d to 2Nd is a storage medium for storing protocol information indicating protocols used when each of the client terminals 21 to 2N communicates with any of the zone servers 11 to 1N.

Figure 5:
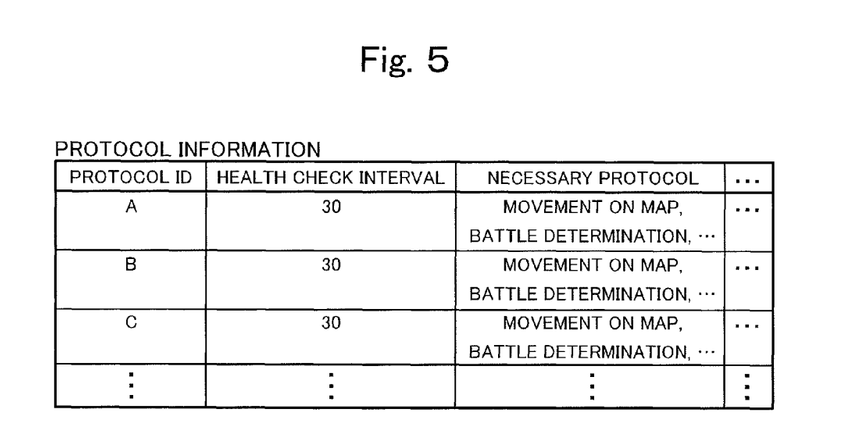
FIG. 5 is an explanatory drawing showing an example of a storage state of protocol information.

FIG. 5 is an explanatory drawing showing an example of a storage state of the protocol information in each of the protocol information memory 21d to 2Nd. As shown in FIG. 5, the protocol information contains: a protocol ID; a health check interval; and a necessary protocol.

Here, the "health check interval" indicates a time interval for carrying out processing to confirm a situation of each of the client terminals 21 to 2N in order to determine whether each of the zone servers 11 to 1N continues to communicate with any of the client terminals 21 to 2N. In the present embodiment, each of the client terminals 21 to 2N has a function (health check function) to notice rejection of termination of a connection to the zone servers 11 to 1N in accordance with the health check interval so that the connection to the zone servers 11 to 1N for which the protocol is set to invalid is terminated.

The "necessary protocol" indicates a protocol other than the health check interval in the protocol information. In the present embodiment, the necessary protocol becomes valid only when the corresponding session information is session information (i.e., as a current session) according to information communication with the zone server corresponding to the zone currently used (that is, information communication between the client terminals 21 to 2N and the zone servers 11 to 1N is carried out). In this regard, as the necessary protocol, for example, protocols relating to "movement on the map by the character", "battle determination (for example, encounter determination with an enemy character, damage determination and the like due to the movement on the map by the character)" and the like are thought in a case where each of the zones has a function of the "map".

Next, an operation of each of the client terminals 21 to 2N in the video game system 100 according to the present embodiment will be described. In this regard, an explanation of any action and processing with no relationship to the present invention may be omitted.

Figure 6:
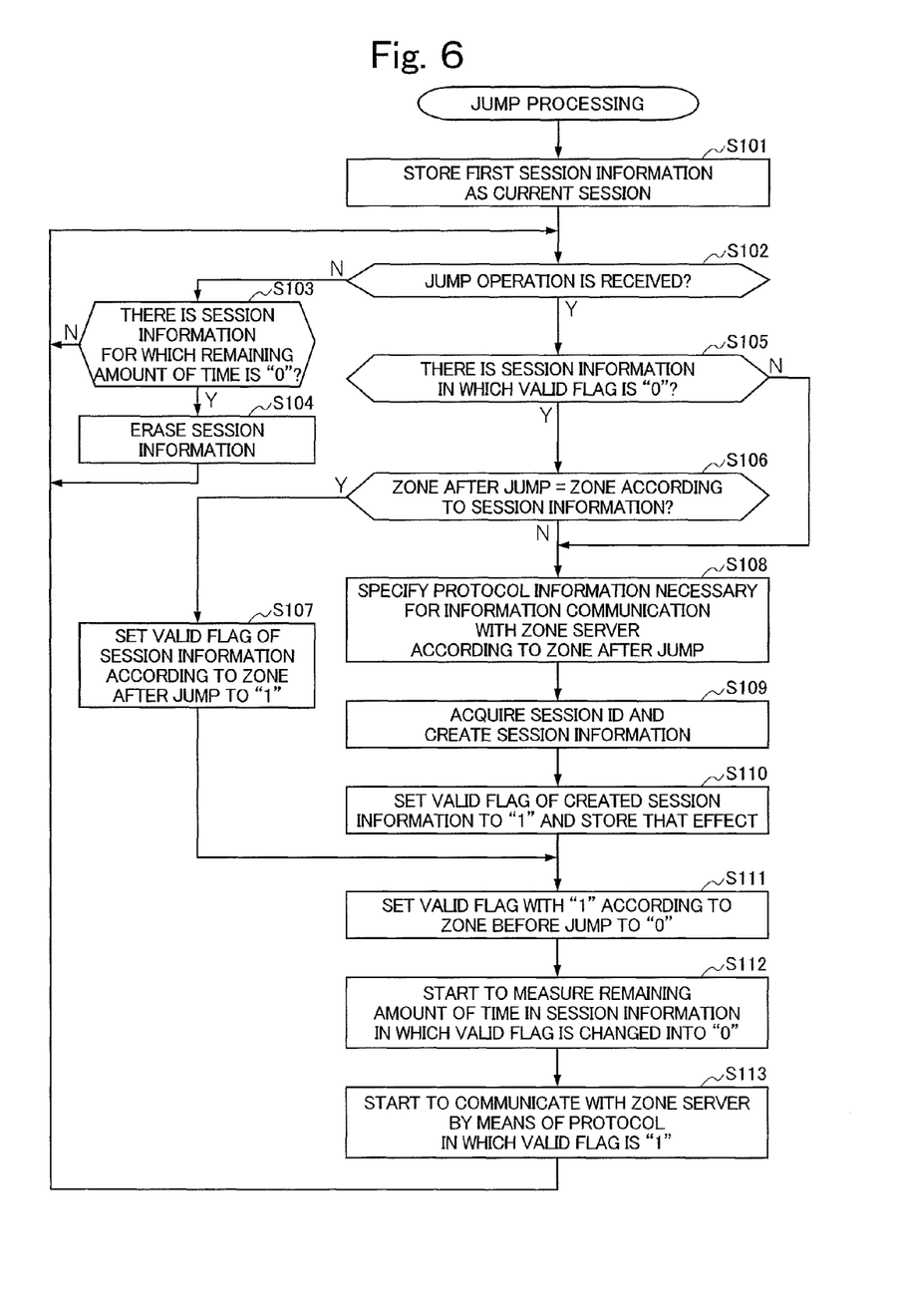
FIG. 6 is a flowchart showing jump processing in the video game system.

FIG. 6 is a flowchart showing an example of jump processing carried out by the video game system 100. In the jump processing, for example, processing to change zones in accordance with progress of the video game and the like is carried out. Namely, the jump processing according to the present embodiment is processing to change a current zone indicating a zone used currently into a new zone indicating a zone changed from the current zone in response to a request to change zones, which is used in the video game carried out by the video game system 100.

Here, an operation of the client terminal 21 operated by a user X will be described as an example. In this regard, in the present embodiment, the zone servers 11 to 1N according to the video game system 100 carry out processing as a general server that carries out user authentication, session management, and delivery of various kinds of information including the zone information in response to a communication request received from the client terminals 21 to 2N, respectively. Therefore, a detailed explanation will be omitted herein.

The client terminal 21 starts up information communication with one of the zone servers 11 to 1N, and makes up a zone on the basis of the provided zone information to carry out the video game, by which the jump processing is started. Here, a case where the client terminal 21 starts information communication with the zone server 11 will be described as an example.

In the jump processing, the client terminal 21 stores first session information (that is, session information between the client terminal 21 and the zone server 11) (Step S101). At this time, since it is needed to set the protocol to valid in order to carry out the information communication, the valid flag is set to "1".

When the first session information is stored, the client terminal 21 determines whether a jump operation by means of an operational input (for example, press of a predetermined press button provided in the client terminal 21), for example, is received from the user X or not (Step S102). In this regard, in the present embodiment, the video game system 100 is configured so as to determine whether a request to change zones by means of a jump operation is received or not. However, the video game system 100 may be configured so as to determine whether there is a request to change zones (i.e., a change request that a video game program automatically outputs) or not on the basis of a progress state of the video game (for example, whether a player character that moves on the map in the video game reaches a predetermined region or not).

In a case where it is determined at Step S102 that the client terminal 21 does not receive a jump operation ("No" at Step S102), the client terminal 21 refers to the session information memory 21c, and determines whether there is session information for which the remaining amount of time runs out (that is, the remaining amount of time becomes "0") or not (Step S103). Here, in a case where it is determined that there is no session information for which the remaining amount of time is "0" ("No" at Step S103), the client terminal 21 causes the processing flow to return to the processing at Step S102. On the other hand, in a case where it is determined that there is session information for which the remaining amount of time is "0" ("Yes" at Step S103), the client terminal 21 erases the session information for which the remaining amount of time is "0" (Step S104), and causes the processing flow to return to the processing at Step S102.

In this regard, in a case where the client terminal 21 erases the session information, the client terminal 21 notifies the zone servers 11 to 1N, which correspond to the session information to be erased, of that effect. This allows the zone servers 11 to 1N to erase the information relating to the session ID that is set to the client terminal 21.

On the other hand, in a case where it is determined that the client terminal 21 receives the jump operation ("Yes" at Step S102), the client terminal 21 refers to the session information memory 21c, and determines whether there is session information in which the valid flag is "0" or not (Step S105). Here, in a case where it is determined that there is no session information in which the valid flag is "0" ("No" at Step S105), the client terminal 21 causes the processing flow to shift to processing at Step S108 (will be described later).

On the other hand, in a case where it is determined that there is session information in which the valid flag is "0" ("Yes" at Step S105), the client terminal 21 determines whether the zone after jump is the same as any of the zones corresponding to the respective pieces of session information in each of which the valid flag is "0" (that is, zones corresponding to the zone server indicated by the server ID in the session information) or not (Step S106). Namely, the client terminal 21 determines whether there is a zone after jump in the zones corresponding to the respective pieces of session information in each of which the valid flag is "0" or not. In the processing at Step S106, in a case where it is determined that the zone after jump is the same as the zone according to the session information in which the valid flag is "0" ("Yes" at Step S106), the client terminal 21 sets the valid flag of the session information according to the zone the same as the zone after jump (that is, the session information containing the zone ID indicating the zone server that delivers the zone) to "1" (Step S107), and causes the processing flow to shift to processing at Step S111 (will be described later).

On the other hand, in a case where it is determined that the zone after jump is not the same as the zone according to the session information ("No" at Step S106), the client terminal 21 refers to the server information memory 21b and the protocol information memory 21d, and specifies protocol information necessary for the information communication with the zone servers 11 to 1N in accordance with the zone after jump (Step S108). Namely, for example, in a case where a jump operation to the zone according to the zone server 12 by the user X is received in the processing at Step S102, the client terminal 21 refers to the server information memory 21b; specifies the protocol ID according to the zone ID indicating the zone server 12; and extracts the protocol information according to the specified protocol ID from the protocol information memory 21d.

When the protocol information is specified, the client terminal 21 creates session information on the basis of the specified protocol information (Step S109). In this regard, the client terminal 21 acquires the session ID by carrying out communication with the zone servers 11 to 1N by means of the specified protocol information. In this regard, it may be configured so that acquisition of the session ID is carried out at the stage for starting communication with the zone servers 11 to 1N in processing at Step S113 (will be described later).

When the session information is created, the client terminal 21 sets the valid flag of the created session information to "1", and stores that effect (Step S110).

Subsequently, the client terminal 21 sets the valid flag of the zone before jump (that is, the valid flag of the session information, in which the valid flag is set to "1", other than the session information in which the valid flag is newly set to "1") to "0" (Step S111). In this regard, in a case where a zone server that provides a plurality of zones to the zone servers 11 to 1N by itself, the client terminal 21 confirms whether both the zone after jump and the zone before jump are zones provided by the same zone server or not. Then, in a case where it can be confirmed that they are the zones provided by the same zone server, the client terminal 21 causes the processing flow to shift to the processing at Step S112 without carrying out the processing herein (i.e., the processing at Step S111).

When the valid flag is changed from "1" to "0" and the protocol is thereby set to invalid, the client terminal 21 starts to measure the remaining amount of time in the session information (Step S112).

When the measurement of the remaining amount of time is started, the client terminal 21 starts to communicate with the zone server 11 to 1N indicated by the server ID in the session information in which the valid flag is set to "1" and the protocol thereby becomes valid (Step S113). Then, the client terminal 21 causes the processing flow to return to the processing at Step S102.

In the present embodiment, the jump processing is always carried out from start to end of the video game in the client terminal 21. Further, at the time of termination of the jump processing, the client terminal 21 initializes the session information. In this regard, the client terminal 21 may be configured so that at the time of the jump processing, the client terminal 21 stores the session information at the end of the jump processing and utilizes it in next jump processing. In a case where the session information at the end of the jump processing is stored, the client terminal 21 may be configured so as to require each of the zone servers 11 to 1N to store information relating to the session ID of the client terminal 21, for example.

As explained above, in the embodiment described above, the video game system 100 is configured so as to include the plurality of servers (for example, the zone servers 11 to 1N) connected to each other via the communication network 50 and one or more client terminals 21 to 2N, each of which is allowed to carry out the video game provided by the plurality of servers, wherein the video game proceeds on a plurality of movable zones (for example, the zones Z1 to Z4). In this case, each of the servers (for example, the zone servers 11 to 1N) is configured so as to include the game information memory 11a to 1Na that stores the game information (for example, zone information) used for a progress of the video game and to provide the game information to each of the client terminals 21 to 2N. Further, each of the client terminals 21 to 2N (for example, the client terminal 21) is configured so as to: include the session information memory 21c to 2Nc (for example, the session information memory 21c) that stores the multiple pieces of session information in which identification information (for example, server IDs) for uniquely specifying the servers is associated with the valid flag indicating whether each of protocols respectively corresponding to the servers is valid or invalid when the client terminals 21 to 2N carry out information communication with the servers; carry out the information communication with the server (for example, any of the zone servers 11 to 1N) corresponding to the protocol in accordance with the protocol indicating that the valid flag is valid; carry out the video game on the zone (for example, the zone Z3) provided so as to be associated with the server (for example, the zone server 13), with which the information communication is carried out, on the basis of the game information from the server; carry out zone changing processing (for example, the jump processing), in which the current zone (for example, the zone Z3) indicating the zone currently used is changed into the new zone (for example, the zone Z1 or zone Z4) indicating the zone changed from the current zone, in response to a request to change the zones (for example, a request based upon a jump operation by the user X, or a request to change the zones based upon whether the player character that moves on the map in the video game reaches the predetermined region) used in the video game thus carried out; update the valid flag (for example, the valid flag that is set to "1"), which indicates that the protocol associated with the server (for example, the zone server 13) corresponding to the current zone is valid, to the state (for example, a state where the valid flag is set to "0") indicating that the protocol is invalid in the zone changing processing; refer to any of the session information memories 21c to 2Nc (for example, the session information memory 21c) to determine whether there is the session information associated with the server (for example, the zone server 11 or zone server 14) corresponding to the new zone; and update the valid flag, which indicates that the protocol associated with the server (for example, the zone server 11) corresponding to the new zone (for example, the zone Z1) is invalid, to the state where the protocol is valid in a case where it is determined that there is the session information. Therefore, it becomes possible to reduce a network processing load when the video game proceeds by connecting the plurality of servers.

Namely, in a case of using the game information delivered from the server to which the client terminal has connected once, it becomes possible to keep the client terminal free from carrying out the processing to specify the protocol corresponding to the server and to create the session information (for example, the processing at Steps S108 to S110 in the jump processing) again. This makes it possible to avoid applying waiting time for a connection to the user without a load on the network.

Further, in the embodiment described above, each of the client terminals 21 to 2N (for example, the client terminal 21) is configured so as to: create the session information, in which the valid flag indicating whether the protocol associated with the server (for example, the zone server 14) corresponding to the new zone (for example, the zone Z4) is valid or invalid is set to the state indicating that the protocol is valid (for example, the state in which the valid flag is set to "1"), in a case where it is determined that there is no session information in the zone changing processing (for example, the jump processing); and store the created session information in the corresponding session information memory 21c to 2Nc (for example, the session information memory 21c). Therefore, it becomes possible to carry out information communication with any server that does not have corresponding session information.

Further, in the embodiment described above, each of the client terminals 21 to 2N (for example, the client terminal 21) is configured so as to erase the session information, for which a predetermined erasing condition is met, (for example, the session information for which the remaining amount of time is "0") of the multiple pieces of session information for each of which the protocol is invalid (for example, the session information for which the valid flag is "0") in the multiple pieces of session information stored in the corresponding session information memory 21c to 2Nc (for example, the session information memory 21c). Therefore, it is possible to prevent the amount of information stored in each of each of the client terminals 21 to 2N from becoming enormous.

Further, in the embodiment described above, each of the client terminals 21 to 2N (for example, the client terminal 21) is configured so as to: set up a predetermined remaining amount of time for the session information for which the valid flag is updated from "1" to "0"; and erase the session information for which the remaining amount of time runs out (that is, the session information for which the predetermined remaining period of time elapses since the valid flag was updated from "1" to "0"). Therefore, it is possible to prevent the amount of information stored in each of each of the client terminals 21 to 2N from becoming enormous more effectively.

In this regard, although it has not been mentioned particularly in the embodiment described above, each of the client terminals 21 to 2N may be configured so as not to erase any session information. By configuring the client terminal in such a manner, it becomes possible to carry out the information communication using the session information certainly in a case where information communication is again carried out with the server with which the information communication has been carried out once.

In this regard, although it has not been mentioned particularly in the embodiment described above, each of the client terminals 21 to 2N (for example, the client terminal 21) may be configured so as to erase at least one of the multiple pieces of session information in a case where the number of the multiple pieces of session information stored in the corresponding session information memory 21c to 2Nc (for example, the session information memory 21c) exceeds a predetermined upper limit number. By configuring the client terminal in such a manner, it is possible to manage the session information more efficiently compared with a case of managing the session information using the remaining amount of time, for example. In this case, for example, the session information, for which the order that the last time the protocol becomes invalid is the oldest, of the session information stored in the session information memory may be set to an erase target. Further, for example, one or more pieces of the session information, for which a frequency of use is a predetermined threshold value or lower, of the session information stored in the session information memory may be set to an erase target. In this regard, for example, each of the client terminals 21 to 2N may be configured so as to erase the session information for which the remaining amount of time is the lowest when the number of session information exceeds an upper limit number. Alternatively, each of the client terminals 21 to 2N may be configured so as to: store a frequency of use of each piece of the session information (for example, the number of times the valid flag becomes "1"); and erase the session information for which the frequency of use is the lowest when the number of session information exceeds the upper limit number.

In this regard, although it has not been mentioned particularly in the embodiment described above, each of the client terminals 21 to 2N may be configured so as to: set up predetermined priority in a case where the session information meets a predetermined condition; and set up an erase condition according to the priority thus set up to the session information for which the priority is set up. In this case, each of each of the client terminals 21 to 2N may be configured so that a "communication frequency" is set up as the predetermined condition, for example. Namely, for example, each of the client terminals 21 to 2N may be configured so as to: specify any of the zone servers 11 to 1N whose communication frequency (for example, the number of times of communication, communication time) is higher; and heighten an initial value of the remaining amount of time, which is to be set up in accordance with the communication frequency. By configuring the client terminal in such a manner, it becomes possible to maintain the session information with higher usability preferentially compared with the other session information.

Further, in the embodiment described above, each of the client terminals 21 to 2N is configured so that the session information contains identification information (for example, the session IDs) by which the server (for example, the zone servers 11 to 1N) is allowed to uniquely specify the client terminals 21 to 2N. Therefore, it is possible to avoid information communication time from being increased due to a load caused by carrying out the processing to identify the client terminal again by the server in a case where the client terminal carries out the information communication with the server according to the session information again after the protocol became invalid and the information communication was thereby terminated.

INDUSTRIAL APPLICABILITY

The present invention is useful to provide a video game by which it is possible to reduce a network processing load when the video game is caused to proceed by connecting a client terminal to a plurality of servers.

What is claimed is:

1. A video game system comprising a plurality of servers and at least one client terminal, the plurality of servers being connected to each other via a communication network, the at least one client terminal being allowed to carry out a video game provided by the plurality of servers,
    wherein each of the plurality of servers comprises:
        a game information memory that stores game information, the game information being used for a progress of the video game; and
        a game information provider that provides the game information to each client terminal,
    wherein each client terminal comprises:
        a session information memory that stores multiple pieces of session information for uniquely specifying the plurality of servers with which information communication is to be carried out, each of the multiple pieces of the session information being created in response to the client terminal carrying out predetermined authentication processing with a corresponding one of the plurality of servers:
        an information communicator that carries out, in accordance with the session information, information communication with a valid server, of the plurality of servers, corresponding to the session information;
        a game executor that carries out the video game based on the game information from the game information provider in the valid server with which the information communicator carries out the information communication; and
        a server changing processor that carries out server changing processing in response to a request to change servers from a current server that currently provides the game information to a new server, in the server changing processing the current server with which the information communication is currently carried out being changed to the new server, the request to change servers being used in the video game carried out by the game executor, and
    wherein the server changing processor of each client terminal includes:
        a first state updater that updates communication server specification information corresponding to the current server to a state indicating that the current server is not a server with which the information communication is to be carried out;
        a session information determiner that refers to the session information memory to determine whether there is any of the multiple pieces of the session information that corresponds to the new server; and
        a second state updater that updates communication server specification information corresponding to the new server to a state indicating that the new server is a server with which the information communication is to be carried out when the session information determiner determines that there is any of the multiple pieces of the session information that corresponds to the new server.

2. The video game system according to claim 1, wherein the video game proceeds on a plurality of movable zones,
the game executor carries out the video game in a zone which is associated with the current server with which the information communicator carries out the information communication,
the server changing processor is a zone changing processor that carries out zone changing processing in response to a request to change zones from a current zone to a new zone, in the zone changing processing the current zone is changed to the new zone, the request to change zones being used in the video game carried out by the game executor,
the first state updater updates the communication server specification information associated with the current server and corresponding to the current zone to a state indicating that the current server is not a server with which the information communication is to be carried out,
the session information determiner determines whether there is any of the multiple pieces of the session information associated with the new server and corresponding to the new zone, and
the second state updater updates the communication server specification information, associated with the new server and corresponding to the new zone, to a state indicating that the new server is a server with which the information communication is to be carried out when the session information determiner determines that there is any of the multiple pieces of the session information associated with the new server and corresponding to the new zone.

3. The video game system according to claim 2, wherein the communication server specification information is a valid flag indicating whether each of protocols is one of valid and invalid, the protocols respectively corresponding to the plurality of servers when the client terminal carries out information communication with the plurality of servers,
the information communicator carries out, in accordance with a protocol indicating that the valid flag is valid, the information communication with the valid server corresponding to the protocol,
the first state updater is a protocol invalidator that updates the valid flag, indicating that the protocol corresponding to the current server is valid, to a state indicating that the protocol is invalid, and
the second state updater is a protocol validator that updates the valid flag, indicating that the protocol corresponding to the new server is invalid, to a state indicating that the protocol is valid when the session information determiner determines that there is any of the multiple pieces of the session information that corresponds to the new server.

4. The video game system according to claim 3, wherein the zone changing processor includes a session information creator that creates new session information, in which the valid flag indicating whether the protocol associated with the new server corresponding to the new zone is one of valid and invalid is set to a state indicating that the protocol is valid, when the session information determiner determines that there is not any of the multiple pieces of the session information that corresponds to the new zone, and stores the new session information in the session information memory.

5. The video game system according to claim 4, wherein each client terminal includes a session information eraser that erases one of the multiple pieces of the session information, for which a predetermined erasing condition is met, when the valid flag of the one of the multiple pieces of the session information indicates that the protocol is invalid.

6. The video game system according to claim 5, wherein the session information eraser erases the one of the multiple pieces of the session information when a predetermined period of time elapses since the protocol invalidator updated the valid flag of the one of the multiple pieces of the session information.

7. The video game system according to claim 6, wherein the session information eraser erases the one of the multiple pieces of the session information when a number of the multiple pieces of the session information stored in the session information memory exceeds a predetermined upper limit number.

8. The video game system according to claim 1, wherein the multiple pieces of the session information are each created by the corresponding one of the plurality of servers and transmitted to the client terminal by carrying out the predetermined authentication processing.

9. The video game system according to claim 8, wherein each of the multiple pieces of the session information is associated with a remaining amount of time, and erased from the session information memory when the remaining amount of time is zero.

10. The video game system according to claim 9, wherein the remaining amount of time of each of the multiple pieces of the session information is measured from when the corresponding one of the plurality of servers is changed to the new server.

11. A server system provided with a plurality of servers, the plurality of servers being connected with each other via a communication network,
wherein each of the plurality of servers comprises:
a game information memory that stores game information therein, the game information being used for a progress of a video game; and
a game information provider that provides the game information to at least one client terminal, each client terminal being allowed to carry out the video game provided by the plurality of servers,
wherein each client terminal comprises:
a session information memory that stores multiple pieces of session information for uniquely specifying the plurality of servers with which information communication is to be carried out, each of the multiple pieces of the session information being created in response to the client terminal carrying out predetermined authentication processing with a corresponding one of the plurality of servers;
an information communicator that carries out, in accordance with the session information, information communication with the server corresponding to the session information;
a game executor that carries out the video game based on the game information from the game information provider in the server with which the information communicator carries out the information communication; and
a server changing processor that carries out server changing processing in response to a request to change a current server that provides the game information to a new server, in the server changing processing the current server with which the information communication is currently carried out being changed to the new server, the request being used in the video game carried out by the game executor, and wherein the server changing processor of each client terminal includes:

a first state updater that updates communication server specification information corresponding to the current server to a state indicating that the current server is not a server with which the information communication is to be carried out;

a session information determiner that refers to the session information memory to determine whether there is any of the multiple pieces of the session information that corresponds to the new server; and a second state updater that updates communication server specification information corresponding to the new server to a state indicating that the new server is a server with which the information communication is to be carried out when the session information determiner determines that there is any of the multiple pieces of the session information that corresponds to the new server.

12. The server system according to claim 11, wherein the multiple pieces of the session information are each created by the corresponding one of the plurality of servers and transmitted to the client terminal by carrying out the predetermined authentication processing.

13. The server system according to claim 12, wherein each of the multiple pieces of the session information is associated with a remaining amount of time, and erased from the session information memory when the remaining amount of time is zero.

14. The server system according to claim 13, wherein the remaining amount of time of each of the multiple pieces of the session information is measured from when the corresponding one of the plurality of servers is changed to the new server.

15. A method of processing a video game carried out by a plurality of servers, the plurality of servers being connected with each other via a communication network, each of the plurality of servers comprising a game information memory that stores game information used for a progress of the video game, the method comprising:

receiving the game information for carrying out the video game provided by the plurality of servers;

storing, in a session information memory, multiple pieces of session information for uniquely specifying the servers with which information communication is to be carried out, each of the multiple pieces of the session information being created in response to predetermined authentication processing being carried out with a corresponding one of the plurality of servers;

carrying out, in accordance with the session information, information communication with a valid server, of the plurality of servers, corresponding to the session information;

carrying out the video game on the basis of the game information provided by the valid server with which the information communication is carried out; and carrying out server changing processing in response to a request to change a current server that provides the game information to a new server, in the server changing processing the current server with which the information communication is currently carried out being changed to the new server, the request being used in the video game, wherein the server changing processing comprises:

updating communication server specification information corresponding to the current server to a state indicating that the current server is not a server with which the information communication is to be carried out;

referring to the session information memory to determine whether there is any of the multiple pieces of the session information that corresponds to the new server; and updating communication server specification information corresponding to the new server to a state indicating that the new server is a server with which the information communication is to be carried out when it determined that there is any of the multiple pieces of the session information that corresponds to the new server.

16. The method according to claim 15, wherein the multiple pieces of the session information are each created by the corresponding one of the plurality of servers by carrying out the predetermined authentication processing.

17. The method according to claim 16, wherein each of the multiple pieces of the session information is associated with a remaining amount of time, and erased from the session information memory when the remaining amount of time is zero.

18. The method according to claim 17, wherein the remaining amount of time of each of the multiple pieces of the session information is measured from when the corresponding one of the plurality of servers is changed to the new server.

\* \* \* \* \*

UNITED STATES PATENT AND TRADEMARK OFFICE
CERTIFICATE OF CORRECTION

| | | |
|---|---|---|
| PATENT NO. | : 9,061,208 B2 | Page 1 of 1 |
| APPLICATION NO. | : 13/104338 | |
| DATED | : June 23, 2015 | |
| INVENTOR(S) | : Y. Inaba | |

It is certified that error appears in the above-identified patent and that said Letters Patent is hereby corrected as shown below:

In the claims

Column 16, line 31 (claim 15, line 43) change "it determined" to --it is determined--.

Signed and Sealed this
Eighth Day of December, 2015

Michelle K. Lee
*Director of the United States Patent and Trademark Office*